(12) United States Patent
Hongyo et al.

(10) Patent No.: US 11,581,839 B2
(45) Date of Patent: Feb. 14, 2023

(54) ROTARY-MACHINE CONTROL DEVICE, REFRIGERANT COMPRESSION APPARATUS, AND AIR CONDITIONER

(71) Applicant: Mitsubishi Electric Corporation, Tokyo (JP)

(72) Inventors: Akane Hongyo, Tokyo (JP); Akira Satake, Tokyo (JP); Kenji Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/279,589

(22) PCT Filed: Jan. 23, 2019

(86) PCT No.: PCT/JP2019/002091
§ 371 (c)(1),
(2) Date: Mar. 25, 2021

(87) PCT Pub. No.: WO2020/152807
PCT Pub. Date: Jul. 30, 2020

(65) Prior Publication Data
US 2021/0344294 A1    Nov. 4, 2021

(51) Int. Cl.
*H02P 27/06* (2006.01)
*H02P 29/024* (2016.01)
*H02P 25/18* (2006.01)
*F25B 31/02* (2006.01)

(52) U.S. Cl.
CPC ............ *H02P 25/18* (2013.01); *F25B 31/026* (2013.01); *H02P 27/06* (2013.01); *H02P 29/024* (2013.01)

(58) Field of Classification Search
CPC ........ H02P 25/18; H02P 27/06; H02P 29/024; F25B 31/026
See application file for complete search history.

(56) References Cited

U.S. PATENT DOCUMENTS 4,609,858 A * 9/1986 Sugita ...................... H02P 1/32
                                                        318/778
5,818,195 A * 10/1998 Frick ..................... H02P 25/184
                                                        318/776
(Continued)

FOREIGN PATENT DOCUMENTS

EP    1830453 A1    9/2007
EP    2009343 B1    3/2017
(Continued)

OTHER PUBLICATIONS

International Search Report and Written Opinion dated Mar. 26, 2019, received for PCT Application PCT/JP2019/002091, Filed on Jan. 23, 2019, 9 pages including English Translation.
(Continued)

*Primary Examiner* — Thai T Dinh
(74) *Attorney, Agent, or Firm* — Xsensus LLP (57) ABSTRACT

A rotary-machine control device includes: a connection switching device switching a connection state of stator windings of a rotary machine; a current detection unit detecting a rotary machine current flowing in the rotary machine; a voltage application unit applying voltage to the rotary machine; a control unit generating a voltage command provided to the voltage application unit and outputting a switching command to switch the connection state to the connection switching device; and an open-phase determination unit determining presence or absence of disconnection in the rotary machine or presence or absence of disconnection of a power distribution line to the rotary machine. During rotation of the rotary machine, the control unit outputs the switching command and the open-phase determination unit determines presence or absence of disconnection.

17 Claims, 7 Drawing Sheets

(56) References Cited

U.S. PATENT DOCUMENTS

| | | | | |
|---|---|---|---|---|
| 6,025,693 | A * | 2/2000 | Smith | H02P 1/265 |
| | | | | 318/794 |
| 8,598,836 | B1 * | 12/2013 | Rabinovich | H02P 3/18 |
| | | | | 318/771 |
| 8,674,650 | B1 * | 3/2014 | Rabinovich | H02P 3/18 |
| | | | | 318/434 |
| 9,496,816 | B2 | 11/2016 | Hatakeyama et al. | |
| 11,005,410 | B2 * | 5/2021 | Iwazaki | H02P 25/184 |
| 2020/0169207 | A1 * | 5/2020 | Kutsuki | H02P 29/00 |

FOREIGN PATENT DOCUMENTS

| | | |
|---|---|---|
| EP | 3651352 A1 | 5/2020 |
| JP | 2006-187057 A | 7/2006 |
| JP | 2008-148490 A | 6/2008 |
| JP | 2008-228513 A | 9/2008 |
| JP | 2008228513 A * | 9/2008 |
| JP | 2009-11088 A | 1/2009 |
| JP | 2013-106424 A | 5/2013 |
| JP | 2018-14829 A | 1/2018 |
| WO | 2011/074145 A1 | 6/2011 |
| WO | 2019/008756 A1 | 1/2019 |
| WO | WO-2019008756 A1 * | 1/2019 ............ F25B 49/025 |

OTHER PUBLICATIONS

Extended European search report dated Dec. 6, 2021, in corresponding European patent Application No. 19911063.6, 7 pages.

* cited by examiner

ROTARY-MACHINE CONTROL DEVICE, REFRIGERANT COMPRESSION APPARATUS, AND AIR CONDITIONER

CROSS-REFERENCE TO RELATED APPLICATION

The present application is based on PCT filing PCT/JP2019/002091, filed Jan. 23, 2019, the entire contents of which are incorporated herein by reference.

FIELD

The present invention relates to a rotary-machine control device that controls an operation of a rotary machine, to a refrigerant compression apparatus, and to an air conditioner.

BACKGROUND

For the purpose of extending the range of the operation frequency of motors, increasing the output torque, and the like, conventionally used motors can, for example, switch the stator windings of the motors between a star connection and a delta connection and change the number of turns of the stator windings. To improve the efficiency, a device is used that switches the connection state of the stator windings of a motor during operation. To determine whether the switching operation has been successfully completed, this device needs to determine the connection state while the motor is rotating.

Patent Literature 1 discloses a technique for a rotor drive system that determines whether the connection state of the stator windings has been switched. The rotor drive system disclosed in Patent Literature 1 compares the ratios between the induced voltage and the rotational speed before and after switching of the stator windings during rotation of the motor, determines that the switching has been successfully performed if the ratio between the induced voltage and the rotational speed is different before and after the switching, and determines that the switching is not performed if the difference in the ratio between the induced voltage and the rotational speed before and after the switching is small.

CITATION LIST

Patent Literature

Patent Literature 1: Japanese Patent Application Laid-open No. 2008-148490

SUMMARY

Technical Problem

The determination method disclosed in Patent Literature 1 is based on the assumption that the stator windings of the motor are either in a state where switching is correctly performed or in a state where switching is not performed at all. However, in practice, an imbalance in impedance may occur between the phases of the motor, for example, when the stator windings of two of the three phases are switched but the stator winding of the remaining one phase fails and is not switched, or when the operation time varies between relays. In such cases, however, because the ratio between the induced voltage and the rotational speed is different before and after the switching, there is a problem in that the rotor drive system disclosed in Patent Literature 1 erroneously determines that switching has been performed successfully.

The present invention has been achieved in view of the above and an object of the present invention is to provide a rotary-machine control device capable of determining that a switching operation has been successfully completed when the connection state of the stator windings of the rotary machine is switched during a rotation operation of the rotary machine.

Solution to Problem

In order to solve the above problems and achieve the object, a rotary-machine control device according to an aspect of the present invention includes: a connection switching device to switch a connection state of stator windings of a rotary machine; a current detection unit to detect a rotary machine current flowing in the rotary machine; a voltage application unit to apply voltage to the rotary machine; a control unit to generate a voltage command provided to the voltage application unit and output a switching command to switch the connection state to the connection switching device; and an open-phase determination unit to determine presence or absence of disconnection in the rotary machine or presence or absence of disconnection of a power distribution line to the rotary machine. In the rotary-machine control device, during rotation of the rotary machine, the control unit outputs the switching command and the open-phase determination unit determines presence or absence of disconnection.

Advantageous Effects of Invention

According to the present invention, an effect is obtained where a rotary-machine control device can determine that a switching operation has been successfully completed when the connection state of the stator windings of the rotary machine is switched during a rotation operation of the rotary machine.

DESCRIPTION OF EMBODIMENTS

A rotary-machine control device, a refrigerant compression apparatus, and an air conditioner according to embodiments of the present invention will be described below in detail with reference to the drawings. This invention is not limited to the embodiments.

First Embodiment

Figure 1:
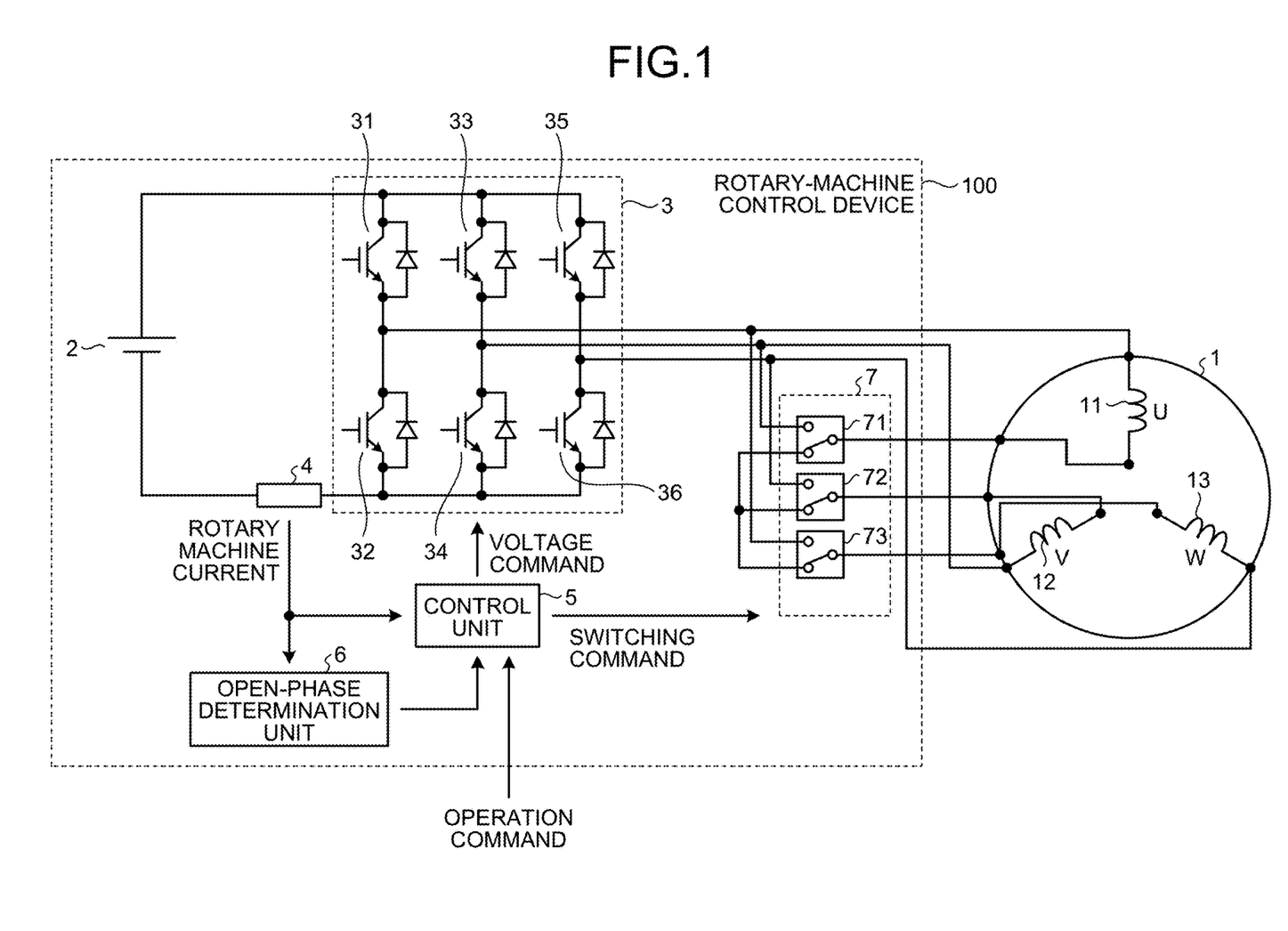
FIG. 1 is a diagram illustrating an exemplary configuration of a rotary-machine control device according to a first embodiment.

FIG. 1 is a diagram illustrating an exemplary configuration of a rotary-machine control device 100 according to a first embodiment of the present invention. A three-phase rotary machine 1 is connected to the rotary-machine control device 100. The rotary-machine control device 100 includes a direct-current voltage source 2, a voltage application unit 3 that supplies power to the rotary machine 1, and a current detection unit 4 that detects current flowing in the rotary machine 1. The rotary-machine control device 100 further includes a control unit 5 that outputs a voltage command to the voltage application unit 3, an open-phase determination unit 6 that determines the presence or absence of disconnection, or breaking, of the internal wiring in the rotary machine 1 or the presence or absence of disconnection of the power distribution line to the rotary machine 1, and a connection switching device 7 that switches the connection state of stator windings 11 to 13 of the rotary machine 1. In the following descriptions, disconnection of the internal wiring in the rotary machine 1 or disconnection of the power distribution line to the rotary machine 1 is in some cases referred to as open phase.

The voltage application unit 3 converts a direct-current voltage $V_{dc}$ supplied from the direct-current voltage source 2 into an alternating-current voltage and applies the alternating-current voltage to the rotary machine 1. In the first embodiment, a three-phase voltage-source inverter is used for the voltage application unit 3. The voltage application unit 3 includes switching elements 31 to 36. The voltage application unit 3 turns on and off each of the switching elements 31 to 36 independently based on the voltage command provided from the control unit 5.

The current detection unit 4 detects current flowing in the rotary machine 1 and outputs current information indicative of the value of the detected current. The current flowing in the rotary machine 1 is in some cases referred to as rotary machine current. In the first embodiment, the current detection unit 4 uses a single shunt current detection scheme that uses a shunt resistor provided on the negative-side DC bus of the voltage application unit 3; however, this is not a limitation. The current detection unit 4 may be a current sensor that uses a current transformer (CT).

The control unit 5 generates the voltage command to be provided to the voltage application unit 3 based on an operation command, such as a speed command and a torque command, input from an external device, and outputs the voltage command to the voltage application unit 3. Known methods for controlling the voltage application unit 3 by the control unit 5, for example, include constant V/f control of outputting voltage proportional to the operation frequency of the rotary machine 1, vector control of controlling the current flowing in the rotary machine 1 by using a rotating coordinate system, and direct torque control of controlling the magnetic flux and torque of the rotary machine 1, and any control method is applicable.

When the control unit 5 uses vector control, direct torque control, or the like, phase information on the rotary machine 1 is needed. The phase information may be obtained by using a position sensor such as a rotary encoder and a resolver (not illustrated), or the phase information may be estimated by using the current flowing in the rotary machine 1 and the voltage command output to the voltage application unit 3.

The control unit 5 generates a switching command to switch the connection state of the stator windings 11 to 13 of the rotary machine 1 based on the operation command, such as a speed command and a torque command, input from an external device, and outputs the switching command to the connection switching device 7.

The connection switching device 7 includes switches 71 to 73 that are switch circuits. The connection switching device 7 performs a switching operation of the switches 71 to 73 during a rotation operation of the rotary machine 1 based on the switching command from the control unit 5 and thereby switches the connection state of the stator windings 11 to 13 of the rotary machine 1. Specifically, the switch 71 switches the connection state of the U-phase stator winding 11, the switch 72 switches the connection state of the V-phase stator winding 12, and the switch 73 switches the connection state of the W-phase stator winding 13. The switches 71 to 73 may each be configured with a mechanical relay or a semiconductor switch. In the first embodiment, the switches 71 to 73 switch the stator windings 11 to 13 of the rotary machine 1 to a star connection or a delta connection.

The direct-current voltage source 2 may be configured from an alternating-current power source and a converter that converts an alternating-current voltage supplied from the alternating-current power source into the direct-current voltage $V_{dc}$.

In the rotary-machine control device 100, the control unit 5 outputs the switching command and the open-phase determination unit 6 determines the presence or absence of disconnection during rotation of the rotary machine 1.

Figure 2:
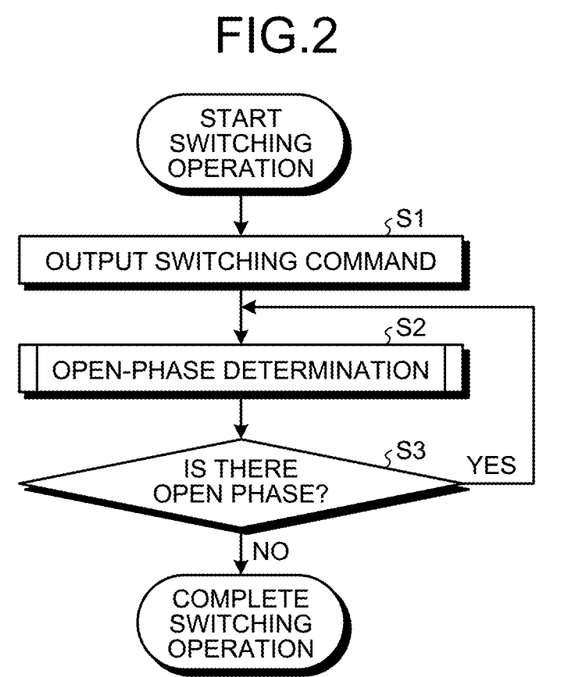
FIG. 2 is a flowchart illustrating the operation of switching the connection state of stator windings by the rotary-machine control device according to the first embodiment.

Next, a description will be given of a method of switching, by the rotary-machine control device 100, the connection state of the stator windings 11 to 13 during a rotation operation of the rotary machine 1 in the first embodiment. FIG. 2 is a flowchart illustrating the operation of switching the connection state of the stator windings 11 to 13 by the rotary-machine control device 100 according to the first embodiment. In the rotary-machine control device 100 that starts the switching operation, the control unit 5 outputs the switching command to the connection switching device 7 (Step S1). Upon receiving the switching command, the connection switching device 7 operates the switches 71 to 73. The operation time varies between the switches 71 to 73. Thus, a certain period of time is needed from when the control unit 5 outputs the switching command to when the connection switching device 7 operates the switches 71 to 73 and the connection state of the stator windings 11 to 13 of the rotary machine 1 is completely switched by the switches 71 to 73.

For this reason, after a predetermined period of time has elapsed since the control unit 5 outputs the switching command, the open-phase determination unit 6 starts to determine the presence or absence of disconnection, that is, performs open-phase determination (Step S2). The method for the open-phase determination by the open-phase determination unit 6 will be described later. The predetermined period of time is determined by the user obtaining, from the data sheet of the switches 71 to 73, the result of a preliminary test, or the like, a value assumed as a period of time taken for the switches 71 to 73 to actually operate after the connection switching device 7 receives the switching command. The predetermined period of time is set by the user such that it is greater than or equal to the mechanical time constant of the connection switching device 7, specifically, greater than or equal to the mechanical time constant of the switches 71 to 73.

When the open-phase determination unit 6 determines that there is an open phase in the rotary machine 1 (Yes at step s3), the open-phase determination unit 6 performs the open-phase determination again (step S2). When the open-phase determination unit 6 determines that there is no open phase in the rotary machine 1 (No at step S3), the rotary-machine control device 100 completes the switching operation.

Figure 3:
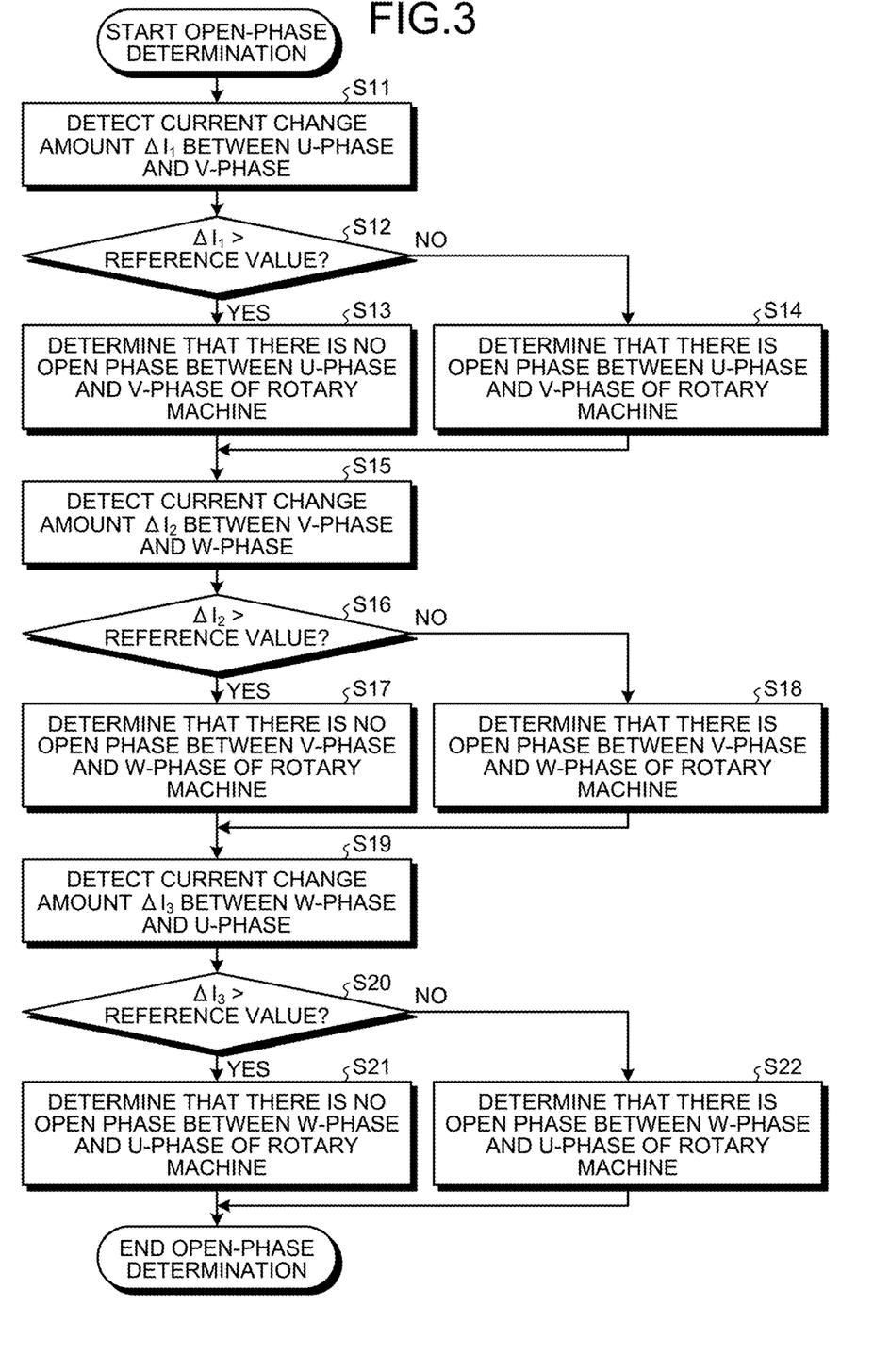
FIG. 3 is a flowchart illustrating the open-phase determination method performed by an open-phase determination unit of the rotary-machine control device according to the first embodiment.
Figure 4:
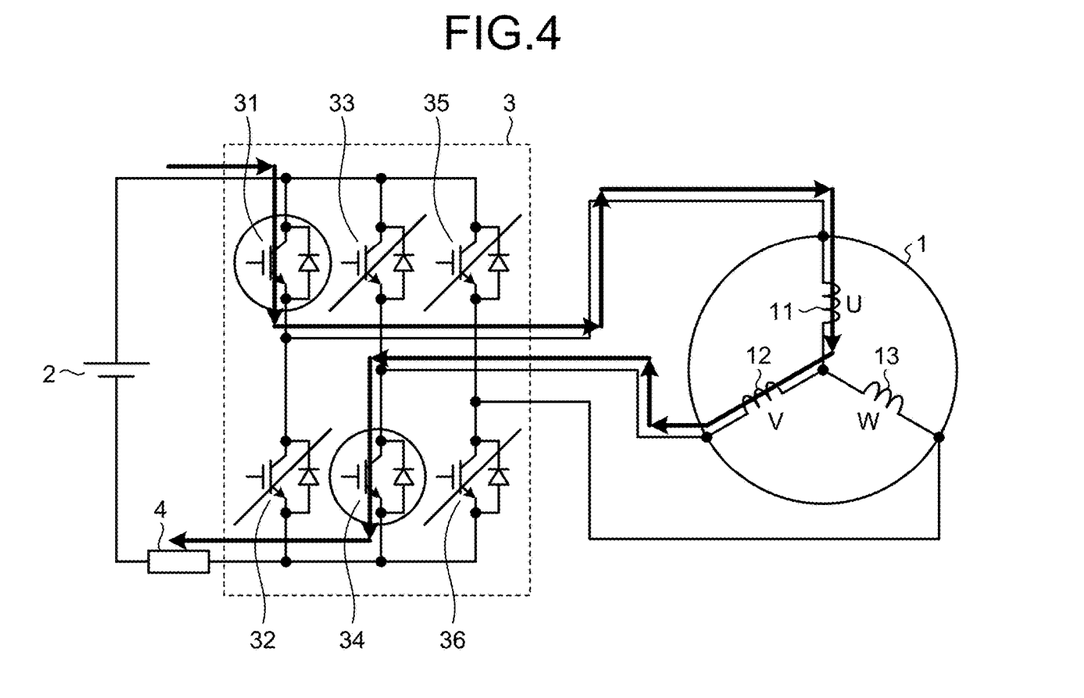
FIG. 4 is a diagram illustrating the state of switching elements and current flowing in a voltage application unit and a rotary machine when a pulse voltage is applied between the U-phase and the V-phase of the rotary machine by the rotary-machine control device according to the first embodiment.
Figure 5:
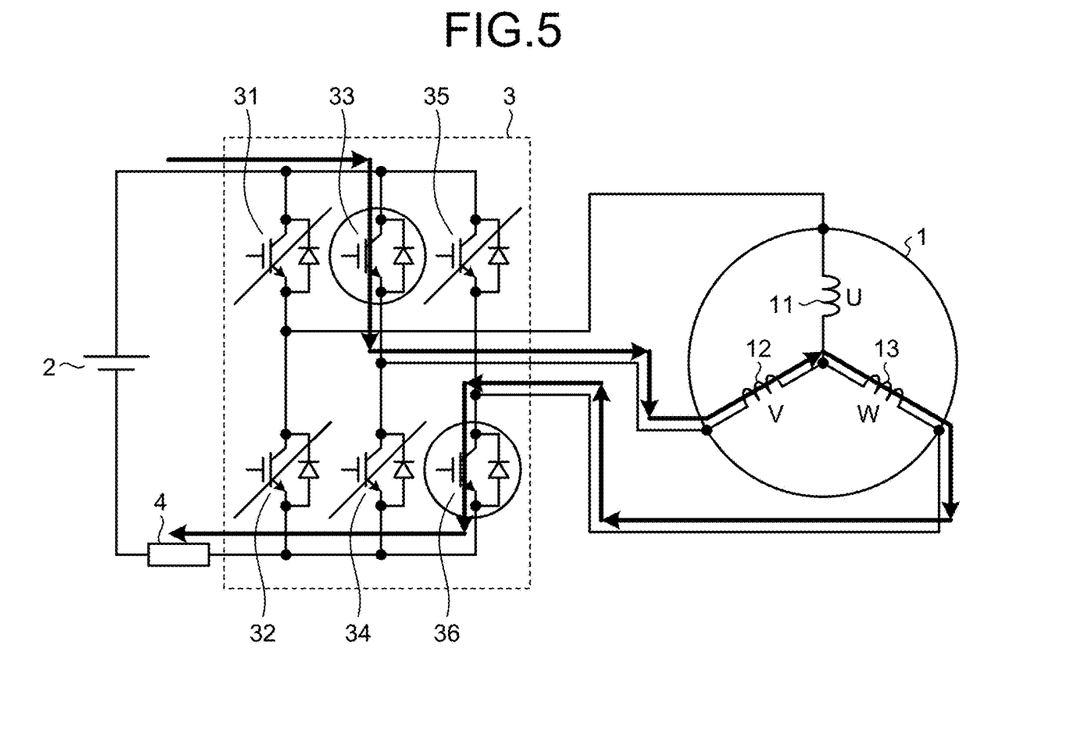
FIG. 5 is a diagram illustrating the state of the switching elements and current flowing in the voltage application unit and the rotary machine when a pulse voltage is applied between the V-phase and the W-phase of the rotary machine by the rotary-machine control device according to the first embodiment.
Figure 6:
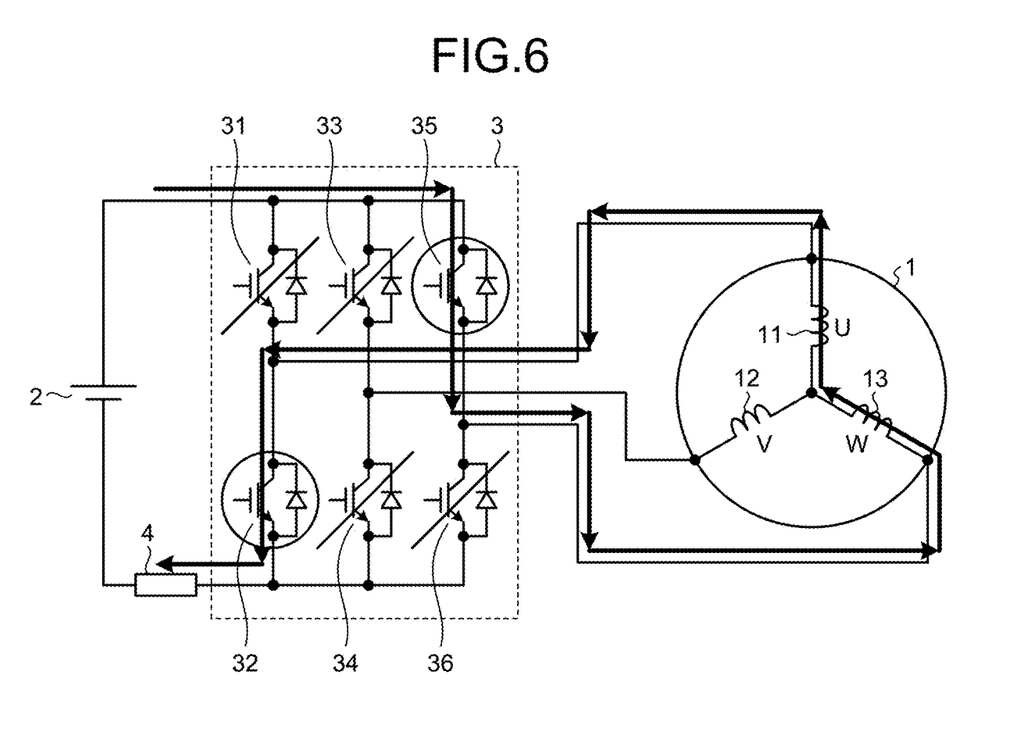
FIG. 6 is a diagram illustrating the state of the switching elements and current flowing in the voltage application unit and the rotary machine when a pulse voltage is applied between the W-phase and the U-phase of the rotary machine by the rotary-machine control device according to the first embodiment.

The open-phase determination method performed by the open-phase determination unit 6 will be specifically described. FIG. 3 is a flowchart illustrating the open-phase determination method performed by the open-phase determination unit 6 of the rotary-machine control device 100 according to the first embodiment. FIG. 4 is a diagram illustrating the state of the switching elements 31 to 36 and current flowing in the voltage application unit 3 and the rotary machine 1 when a pulse voltage is applied between the U-phase and the V-phase of the rotary machine 1 by the rotary-machine control device 100 according to the first embodiment. FIG. 5 is a diagram illustrating the state of the switching elements 31 to 36 and current flowing in the voltage application unit 3 and the rotary machine 1 when a pulse voltage is applied between the V-phase and the W-phase of the rotary machine 1 by the rotary-machine control device 100 according to the first embodiment. FIG. 6 is a diagram illustrating the state of the switching elements 31 to 36 and current flowing in the voltage application unit 3 and the rotary machine 1 when a pulse voltage is applied between the W-phase and the U-phase of the rotary machine 1 by the rotary-machine control device 100 according to the first embodiment. FIG. 4 to FIG. 6 illustrate the connection configurations when the stator windings 11 to 13 of the rotary machine 1 are switched to the star connection. The pulse voltage is a test voltage for the open-phase determination performed by the open-phase determination unit 6 and is applied from the voltage application unit 3 to the rotary machine 1 under the control of the open-phase determination unit 6.

First, the open-phase determination unit 6 instructs the control unit 5 to output the voltage command to turn on the switching elements 31 and 34 and turn off the switching elements 32, 33, 35, and 36 during a time period $T_p$, thereby causing the pulse voltage to be applied between the U-phase and the V-phase of the rotary machine 1. The user sets the time period $T_p$ from about tens of microseconds to about hundreds of microseconds. When there is no open phase between the U-phase and the V-phase of the rotary machine 1, current flows through the path illustrated in FIG. 4, i.e., sequentially through the switching element 31, the U-phase of the rotary machine 1, the V-phase of the rotary machine 1, the switching element 34, and the current detection unit 4. The open-phase determination unit 6 obtains, from the current detection unit 4, values of the negative-side DC bus current before and after application of the pulse voltage. The open-phase determination unit 6 detects a current change amount $\Delta I_1$ between the U-phase and the V-phase from the difference between the obtained values (step S11). Then, the open-phase determination unit 6 instructs the control unit 5 to turn off all of the switching elements 31 to 36, thereby causing the current flowing in the current detection unit 4 to be sufficiently small.

The open-phase determination unit 6 determines whether the value of the current change amount $\Delta I_1$ is larger than a reference value $I_{test}$ (step S12). When the value of the current change amount $\Delta I_1$ is larger than the reference value $I_{test}$ (Yes at step S12), the open-phase determination unit 6 determines that there is no open phase between the U-phase and the V-phase of the rotary machine 1 (step S13). When the value of the current change amount $\Delta I_1$ is smaller than or equal to the reference value $I_{test}$ (No at step S12), the open-phase determination unit 6 determines that there is an open phase between the U-phase and the V-phase of the rotary machine 1 (step S14).

Next, the open-phase determination unit 6 instructs the control unit 5 to output the voltage command to turn on the switching elements 33 and 36 and turn off the switching elements 31, 32, 34, and 35 during the time period $T_p$, thereby causing the pulse voltage to be applied between the V-phase and the W-phase of the rotary machine 1. When there is no open phase between the V-phase and the W-phase of the rotary machine 1, current flows through the path illustrated in FIG. 5, i.e., sequentially through the switching element 33, the V-phase of the rotary machine 1, the W-phase of the rotary machine 1, the switching element 36, and the current detection unit 4. The open-phase determination unit 6 obtains, from the current detection unit 4, values of the negative-side DC bus current before and after application of the pulse voltage. The open-phase determination unit 6 detects a current change amount $\Delta I_2$ between the V-phase and the W-phase from the difference between the obtained values (step S15). Then, the open-phase determination unit 6 instructs the control unit 5 to turn off all of the switching elements 31 to 36, thereby causing the current flowing in the current detection unit 4 to be sufficiently small.

The open-phase determination unit 6 determines whether the value of the current change amount $\Delta I_2$ is larger than the reference value $I_{test}$ (step S16). When the value of the current change amount $\Delta I_2$ is larger than the reference value $I_{test}$ (Yes at step S16), the open-phase determination unit 6 determines that there is no open phase between the V-phase and the W-phase of the rotary machine 1 (step S17). When the value of the current change amount $\Delta I_2$ is smaller than or equal to the reference value $I_{test}$ (No at step S16), the open-phase determination unit 6 determines that there is an open phase between the V-phase and the W-phase of the rotary machine 1 (step S18).

Next, the open-phase determination unit 6 instructs the control unit 5 to output the voltage command to turn on the switching elements 32 and 35 and turn off the switching elements 31, 33, 34, and 36 during the time period $T_p$, thereby causing the pulse voltage to be applied between the W-phase and the U-phase of the rotary machine 1. When there is no open phase between the W-phase and the U-phase of the rotary machine 1, current flows through the path illustrated in FIG. 6, i.e., sequentially through the switching element 35, the W-phase of the rotary machine 1, the U-phase of the rotary machine 1, the switching element 32, and the current detection unit 4. The open-phase determination unit 6 obtains, from the current detection unit 4, values of the negative-side DC bus current before and after application of the pulse voltage. The open-phase determination unit 6 detects a current change amount $\Delta I_3$ between the W-phase and the U-phase from the difference between the obtained values (step S19). Then, the open-phase determination unit 6 instructs the control unit 5 to turn off all of the switching elements 31 to 36, thereby causing the current flowing in the current detection unit 4 to be sufficiently small.

The open-phase determination unit 6 determines whether the value of the current change amount $\Delta I_3$ is larger than the reference value $I_{test}$ (step s20). When the value of the current change amount $\Delta I_3$ is larger than the reference value $I_{test}$ (Yes at step S20), the open-phase determination unit 6 determines that there is no open phase between the W-phase and the U-phase of the rotary machine 1 (step S21). When the value of the current change amount $\Delta I_3$ is smaller than or equal to the reference value $I_{test}$ (No at step S20), the open-phase determination unit 6 determines that there is an open phase between the W-phase and the U-phase of the rotary machine 1 (step S22).

The reference value $I_{test}$ is determined by the user from an inductance value L per phase of the rotary machine 1 and the time period $T_p$ during which the pulse voltage is applied. As is well known, upon step input of voltage V to RL load, the current response rises with a slope of V/L. Accordingly, for example, if there is no open phase between the U-phase and the V-phase, the current change amount $\Delta I_1$ can be obtained by formula (1). Thus, it is sufficient if the reference value $I_{test}$ is set to a value obtained by adding an appropriate margin to formula (1). The margin is set taking into account the accuracy of the current detection unit 4, the induced voltage generated by the rotation of the rotary machine 1, and the like.

$$\Delta I_1 = V_{dc}/(2 \times L) \quad (1)$$

In the first embodiment, when the pulse voltage is applied to the rotary machine 1 from the voltage application unit 3, the open-phase determination unit 6 determines the presence or absence of disconnection by comparing the value of the current detected by the current detection unit 4 with the reference value. In other words, the open-phase determination unit 6 performs the open-phase determination by a method of applying, to the rotary machine 1, the pulse voltage for the determination and observing the current response; however, the method for the open-phase determination is not limited thereto, and the open-phase determination unit 6 may use other methods that enable the open-phase determination to be performed during rotation of the rotary machine 1. Examples of the other methods include a method of observing the induced voltage generated by the rotation of the rotary machine 1. Specifically, as in the technique described in paragraph 0042 in Patent Literature 1, as a result of comparison of the ratios between the induced voltage and the rotational speed before and after the switching of the stator windings 11 to 13, if the ratio between the induced voltage and the rotation speed is different before and after the switching, it may be determined that the switching has been successfully performed, and if the difference in the ratio between the induced voltage and the rotational speed before and after the switching is small, it may be determined that the switching is not performed. However, with the method of observing the induced voltage, it is necessary to keep observing the induced voltage at least during one rotation of the rotary machine 1 in electrical degrees to obtain one induced voltage; therefore, this method takes a long time to perform the open-phase determination.

Moreover, the technique described in paragraph 0042 in Patent Literature 1 is based on the assumption that the stator windings 11 to 13 of the rotary machine 1 are either in a state where switching is correctly performed or in a state where switching is not performed at all. However, as described above, in practice, a certain period of time is needed from when the switching command is output to when the connection state of the stator windings 11 to 13 is completely switched. Moreover, the operation time varies between the switches 71 to 73. Thus, for example, when the stator windings of two phases among the stator windings 11 to 13 of the three phases of the rotary machine 1 have been switched but the stator winding of the remaining one phase has not yet been switched, an imbalance in impedance may occur between the phases of the rotary machine 1. In such cases, if the technique described in Patent Literature 1 is used, because the ratio between the induced voltage and the rotational speed is different before and after the output of the switching command, the switching is erroneously determined to have been performed successfully.

In contrast, in the first embodiment, in the rotary-machine control device 100, the open-phase determination unit 6 uses a method of applying, to the rotary machine 1, the pulse voltage for the determination and observing the current response. This method only requires applying the pulse voltage for a time period from about tens of microseconds to about hundreds of microseconds three times and observing the current response; therefore, the period of time required for the determination is shorter than that required for the method of observing the induced voltage. Moreover, the open-phase determination unit 6 determines the presence or absence of an open phase between the respective lines of the three phases of the rotary machine 1; therefore, even when the operation time varies between the switches 71 to 73, the connection state can still be correctly determined.

As described above, with the rotary-machine control device 100 according to the present embodiment, the open-phase determination unit 6 controls the voltage command output from the control unit 5 such that current flows in the stator windings of two phases among the three phases, i.e., the U-phase, the V-phase, and the W-phase, of the rotary machine 1, and determines the presence or absence of an open phase, that is, disconnection for each combination of two phases. Consequently, when switching the connection state of the stator windings 11 to 13 of the rotary machine 1 during a rotation operation of the rotary machine 1, even in the case where an imbalance may occur between the phases, the rotary-machine control device 100 can still determine the connection state correctly and thus can determine that the switching operation has completed successfully.

Moreover, with the configuration illustrated in FIG. 1, the rotary-machine control device 100 can definitely switch the connection state of the stator windings 11 to 13 of the rotary machine 1 during a rotation operation of the rotary machine 1. Moreover, even when the connection switching device 7 uses the switches 71 to 73 that require a few milliseconds for the operation, such as mechanical relays, the rotary-machine control device 100 can definitely determine whether the connection state has switched.

Second Embodiment

In a second embodiment, a description will be given of a refrigerant compression apparatus that includes the rotary-machine control device 100 according to the first embodiment, and an air conditioner that includes the refrigerant compression apparatus.

Figure 7:
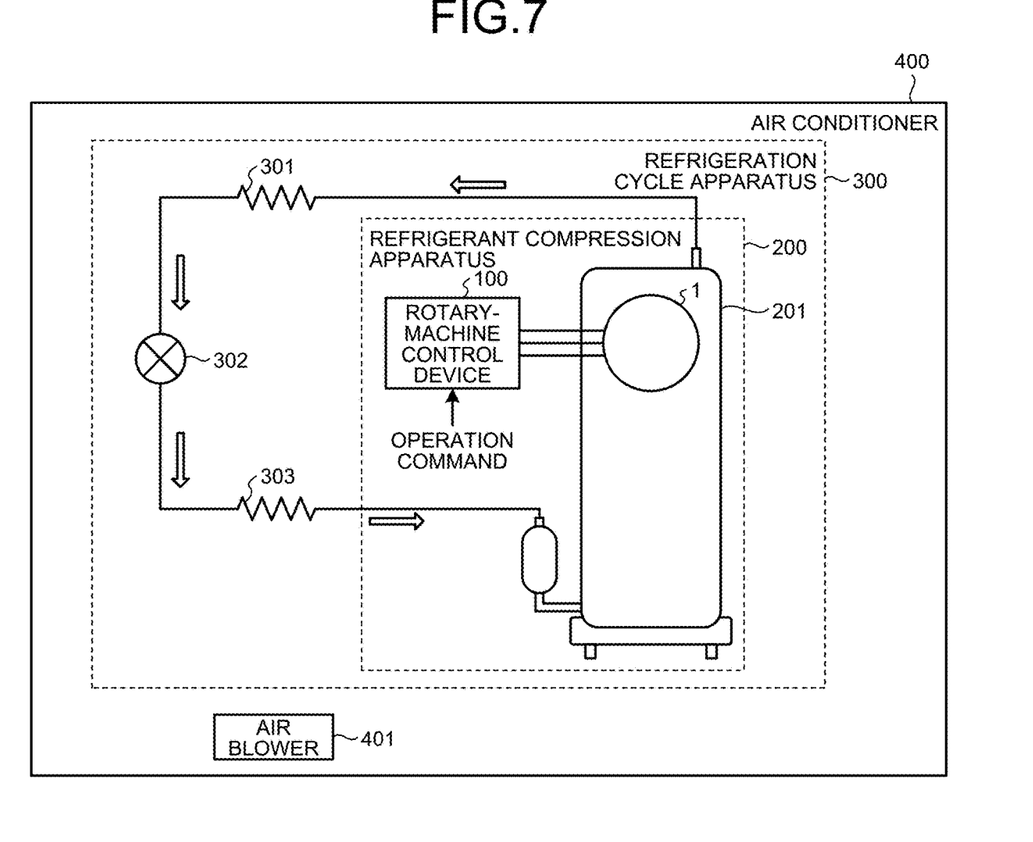
FIG. 7 is a diagram illustrating an exemplary configuration of an air conditioner according to a second embodiment.

FIG. 7 is a diagram illustrating an exemplary configuration of an air conditioner 400 according to the second embodiment. The air conditioner 400 includes a refrigeration cycle apparatus 300 and an air blower 401. The refrigeration cycle apparatus 300 includes a refrigerant compression apparatus 200, a condenser 301, an expansion valve 302, and an evaporator 303. The refrigerant compression apparatus 200 includes a compressor 201 that includes the rotary machine 1, and the rotary-machine control device 100 according to the first embodiment that outputs a three-phase alternating-current voltage to the rotary machine 1. Although not illustrated in FIG. 7, the configuration of the rotary-machine control device 100 is similar to the configuration thereof in the first embodiment illustrated in FIG. 1.

As illustrated in FIG. 7, a pipe connects between the compressor 201 and the condenser 301. Similarly, pipes connect between the condenser 301 and the expansion valve 302, between the expansion valve 302 and the evaporator 303, and between the evaporator 303 and the compressor 201. Consequently, refrigerant circulates through the compressor 201, the condenser 301, the expansion valve 302, and the evaporator 303.

The rotary machine 1 illustrated in FIG. 7 is an electric motor subjected to variable speed control by the rotary-machine control device 100 so that refrigerant gas is compressed and is converted to high-pressure gas in the compressor 201. The compressor 201 compresses a medium such as refrigerant through rotation of the rotary machine 1. Although not illustrated in FIG. 7, the rotary machine 1 has a similar configuration to that in the first embodiment illustrated in FIG. 1. In a similar manner to the first embodiment, the stator windings 11 to 13 of the rotary machine 1 are connected to the connection switching device 7 of the rotary-machine control device 100 for switching the connection configuration of the stator windings 11 to 13.

In the refrigeration cycle apparatus 300, the processes of evaporation, compression, condensation, and expansion of refrigerant are repeated. The refrigerant changes from liquid to gas and further changes from gas to liquid, allowing heat exchange between the refrigerant and air outside the apparatus. Thus, the air conditioner 400 can be configured by combining the refrigeration cycle apparatus 300 and the air blower 401 that circulates air outside the apparatus.

The evaporator 303 evaporates refrigerant liquid under low pressure to remove heat from the air around the evaporator 303, thereby exerting the cooling effect. To condense the refrigerant, the compressor 201 compresses the refrigerant gas gasified in the evaporator 303 and converts it to high-pressure gas. The condenser 301 releases heat of the refrigerant gas heated up in the compressor 201 to condense and convert the high-pressure refrigerant gas to refrigerant liquid. The expansion valve 302 performs throttling expansion on the refrigerant liquid to convert the refrigerant liquid to low-pressure liquid, thereby making the refrigerant evaporable in the evaporator 303.

Because the regulations for energy saving have been enhanced year by year, the air conditioner 400 is required to provide not only comfort but also high efficiency. Accordingly, it is important for the refrigeration cycle apparatus 300 to operate the rotary machine 1 in a wide speed range from low speed to high speed with high efficiency. Thus, in the refrigeration cycle apparatus 300, the rotary-machine control device 100 switches the connection configuration of the stator windings 11 to 13 of the rotary machine 1 in accordance with the rotation speed of the rotary machine 1. This enables a reduction in the loss of the voltage application unit 3 and thus has significance.

For example, when the difference between the room temperature and the set temperature is large, the rotary-machine control device 100 determines to set the stator windings 11 to 13 of the rotary machine 1 to the delta connection to perform a high-speed operation until the room temperature approaches the set temperature. When the room temperature has approached the set temperature, the rotary-machine control device 100 switches the stator windings 11 to 13 of the rotary machine 1 to the star connection to perform a low-speed operation. Note that, in the case where the rotary machine 1 drives the compressor 201 of the refrigeration cycle apparatus 300 as in the second embodiment, if the rotation operation of the rotary machine 1 is paused to switch the stator windings 11 to 13, torque required for restarting the rotary machine 1 increases and the rotary-machine control device 100 may fail to start the rotary machine 1. For this reason, the rotary-machine control device 100 needs to restart the rotary machine 1 after a lapse of a few minutes that is required for the state of the refrigerant to stabilize sufficiently. This means that the refrigerant cannot be pressurized for a few minutes during which the compressor 201 is stopped, which may degrade the cooling performance or the heating performance. Consequently, the room temperature may not be maintained constant. Therefore, it is desirable that the rotary-machine control device 100 switches the stator windings 11 to 13 during a rotation operation of the rotary machine 1.

Further, because the air conditioner 400 with reduced manufacturing costs is required, it is desirable to use mechanical relays, which are inexpensive compared to semi-conductor switches, for the switches 71 to 73. However, in general, the operation time is likely to vary between mechanical relays. Thus, when mechanical relays are used for the switches 71 to 73, an imbalance may occur between the phases. For example, although a switch of a certain phase has finished operating, a switch of another phase has not started to operate or is still in operation.

In such a situation, with the technique disclosed in Patent Literature 1, because the ratio between the induced voltage and the rotational speed before the switching command is output is different from that when an imbalance exists between the phases, the switching operation is erroneously determined to have finished. Then, the control unit 5 stops the switching operation and restarts the normal operation; therefore, operations are performed with an incorrect connection configuration, which causes the rotary machine 1 to stop or increases the risk of device failure.

The air conditioner 400 according to the second embodiment uses the rotary-machine control device 100 described in the first embodiment; therefore, even when the operation time varies between the switches 71 to 73, the presence or absence of an open phase can be correctly determined after the connection configuration of the stator windings 11 to 13 is switched during rotation of the rotary machine 1. Therefore, the air conditioner 400 does not need to stop the rotary machine 1 at the time of switching of the stator windings 11 to 13 and thus can operate in a wide speed range with high efficiency while maintaining comfort.

Moreover, the sequence for switching the connection state of the stator windings 11 to 13 by the rotary-machine control device 100 is very simple and imposes a low computational load; therefore, this sequence can be implemented in an inexpensive microcontroller. Further, even when mechanical relays, which are inexpensive, are used for the switches 71 to 73 that switch the connection configuration of the stator windings 11 to 13 of the rotary machine 1, the rotary-machine control device 100 can still perform the open-phase determination. This results in a reduction in product costs as a whole.

The refrigerant compression apparatus 200 has been described here as an example of application of the rotary-machine control device 100 including the open-phase determination unit 6; however, this is merely an example, and the rotary-machine control device 100 is useful also for other mechanical apparatuses. For example, the rotary-machine control device 100 may be used for a mechanical apparatus such as a fan and a pump.

With the configuration illustrated in FIG. 7, the air conditioner 400 can quickly and stably switch the connection configuration of the stator windings 11 to 13 of the rotary machine 1 during operation. Therefore, the air conditioner 400 can operate in a wide speed range with high efficiency while maintaining comfort.

The functions of the control unit 5 and the open-phase determination unit 6 of the rotary-machine control device 100 described in the first and second embodiments are implemented by processing circuitry. The processing circuitry may be dedicated hardware or a processing device that executes programs stored in a memory device.

Figure 8:
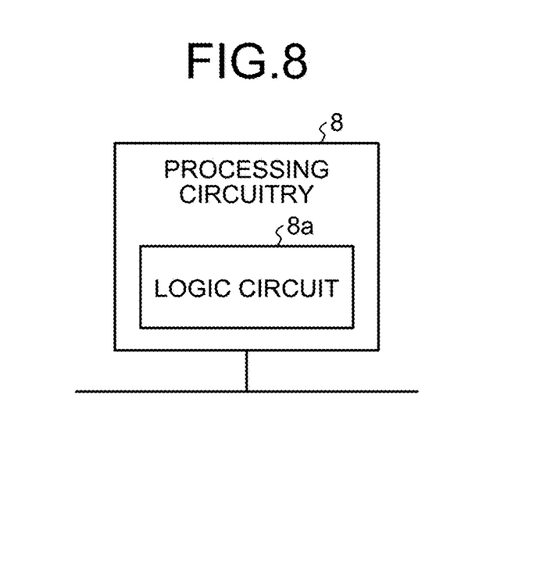
FIG. 8 is a diagram illustrating an exemplary configuration for implementing, with hardware, the functions of a control unit and the open-phase determination unit of the rotary-machine control device.

When the processing circuitry is dedicated hardware, the processing circuitry corresponds to a single circuit, a composite circuit, a programmed processor, a parallel-programmed processor, an application specific integrated circuit (ASIC), a field programmable gate array (FPGA), or a combination thereof. FIG. 8 is a diagram illustrating an exemplary configuration for implementing, with hardware, the functions of the control unit 5 and the open-phase determination unit 6 of the rotary-machine control device 100. A logic circuit 8a for implementing the functions of the control unit 5 and the open-phase determination unit 6 is incorporated in processing circuitry 8.

When the processing circuitry is a processing device, the functions of the control unit 5 and the open-phase determination unit 6 are implemented by software, firmware, or a combination of software and firmware.

Figure 9:
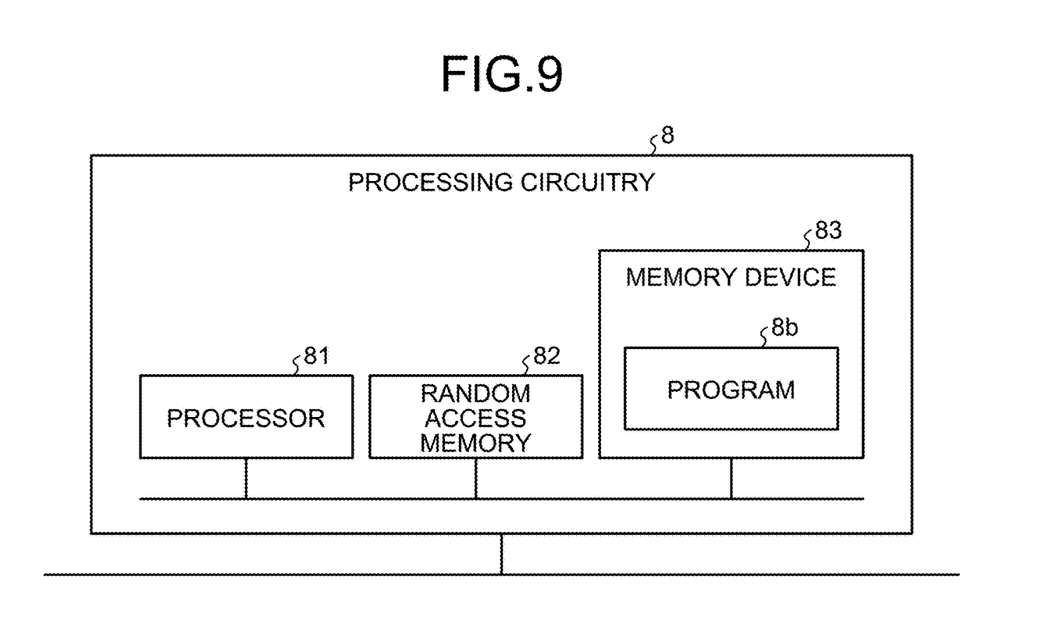
FIG. 9 is a diagram illustrating an exemplary configuration for implementing, with software, the functions of the control unit and the open-phase determination unit of the rotary-machine control device.

FIG. 9 is a diagram illustrating an exemplary configuration for implementing, with software, the functions of the control unit 5 and the open-phase determination unit 6 of the rotary-machine control device 100. The processing circuitry 8 includes a processor 81 that executes a program 8b, a random access memory 82 that is used by the processor 81 as a work area, and a memory device 83 that stores the program 8b. The processor 81 loads the program 8b stored in the memory device 83 into the random access memory 82 and executes the program 8b to implement the functions of the control unit 5 and the open-phase determination unit 6. Software or firmware is written in a programming language and is stored in the memory device 83. The processor 81 is exemplified by a central processing unit but is not limited thereto. The memory device 83 may be a semiconductor memory such as a random access memory (RAM), a read only memory (ROM), a flash memory, an erasable programmable read only memory (EPROM), or an electrically erasable programmable read only memory (EEPROM: registered trademark). The semiconductor memory may be a nonvolatile memory or a volatile memory. Moreover, in addition to the semiconductor memory, a magnetic disk, a flexible disk, an optical disk, a compact disc, a mini disc, or a digital versatile disc (DVD) may also be used for the memory device 83. The processor 81 may output data such as computation results to the memory device 83 or cause the memory device 83 to store the data. Alternatively, the processor 81 may cause an auxiliary memory device (not illustrated) to store the data via the random access memory 82.

The processing circuitry 8 reads and executes the program 8b stored in the memory device 83 to implement the functions of the control unit 5 and the open-phase determination unit 6. In other words, the program 8b causes a computer to execute the procedure and method for implementing the functions of the control unit 5 and the open-phase determination unit 6.

The processing circuitry 8 may be partially implemented by dedicated hardware, while being partially implemented by software or firmware.

As described above, the processing circuitry 8 can implement each function described above by hardware, software, firmware, or a combination thereof.

The configurations described in the above embodiments are merely examples of an aspect of the present invention. The configurations can be combined with other well-known techniques and part of the configurations can be omitted or modified without departing from the scope of the present invention.

REFERENCE SIGNS LIST 100 rotary-machine control device; 1 rotary machine; 11 to 13 stator winding; 2 direct-current voltage source; 3 voltage application unit; 31 to 36 switching element; 4 current detection unit; 5 control unit; 6 open-phase determination unit; 7 connection switching device; 71 to 73 switch; 8 processing circuitry; 8a logic circuit; 8b program; 81 processor; random access memory; 83 memory device; 200 refrigerant compression apparatus; 201 compressor; 300 refrigeration cycle apparatus; 301 condenser; 302 expansion valve; 303 evaporator; 400 air conditioner; 401 air blower.

The invention claimed is:

1. A rotary-machine control device comprising:
a connection switching device to switch a connection state of stator windings of a rotary machine;
a current detector to detect a rotary machine current flowing in the rotary machine;
voltage application circuitry to apply voltage to the rotary machine;
control circuitry to generate a voltage command provided to the voltage application circuitry and output a switching command to switch the connection state to the connection switching device; and
open-phase determination circuitry to determine presence or absence of disconnection in the rotary machine or of a power distribution line to the rotary machine, wherein
during rotation of the rotary machine, the control circuitry outputs the switching command and the open-phase determination circuitry determines the presence or the absence of the disconnection in the rotary machine or of the power distribution line to the rotary machine, and
after a predetermined period of time elapses from output of the switching command, the open-phase determination circuitry starts to determine the presence or the absence of the disconnection in the rotary machine or of the power distribution line to the rotary machine,
wherein the predetermined period of time is based on a characteristic of the connection switching device.

2. The rotary-machine control device according to claim 1, wherein the predetermined period of time is greater than or equal to a mechanical time constant of the connection switching device.

3. The rotary-machine control device according to claim 2, wherein when a test voltage for the determination is applied to the rotary machine from the voltage application circuitry, the open-phase determination circuitry determines presence or absence of disconnection by comparing a value of the rotary machine current detected by the current detector with a reference value.

4. A refrigerant compression apparatus comprising:
a compressor including the rotary machine, the compressor compressing a medium through rotation of the rotary machine; and
the rotary-machine control device according to claim 3 to output a three-phase alternating-current voltage to the rotary machine.

5. An air conditioner comprising the refrigerant compression apparatus according to claim 4.

6. A refrigerant compression apparatus comprising:
a compressor including the rotary machine, the compressor compressing a medium through rotation of the rotary machine; and
the rotary-machine control device according to claim 2 to output a three-phase alternating-current voltage to the rotary machine.

7. An air conditioner comprising the refrigerant compression apparatus according to claim 6.

8. The rotary-machine control device according to claim 1, wherein when a test voltage for the determination is applied to the rotary machine from the voltage application circuitry, the open-phase determination circuitry determines presence or absence of disconnection by comparing a value of the rotary machine current detected by the current detector with a reference value.

9. A refrigerant compression apparatus comprising:
a compressor including the rotary machine; the compressor compressing a medium through rotation of the rotary machine; and
the rotary-machine control device according to claim 8 to output a three-phase alternating-current voltage to the rotary machine.

10. An air conditioner comprising the refrigerant compression apparatus according to claim 9.

11. A refrigerant compression apparatus comprising:
a compressor including the rotary machine, the compressor compressing a medium through rotation of the rotary machine; and
the rotary-machine control device according to claim 1 to output a three-phase alternating-current voltage to the rotary machine.

12. An air conditioner comprising the refrigerant compression apparatus according to claim 11.

13. The rotary-machine control device according to claim wherein the open-phase determination circuitry determines the presence or the absence of the disconnection in the rotary machine or of the power distribution line to the rotary motor prior to the rotary machine completing one full rotation.

14. A rotary-machine control system comprising:
a connection switching device to switch a connection state of stator windings of a rotary machine;
a current detector to detect a rotary machine current flowing in the rotary machine;
voltage application circuitry to apply voltage to the rotary machine;
control circuitry to generate a voltage command provided to the voltage application circuitry and output a switching command to switch the connection state to the connection switching device; and
open-phase determination circuitry to determine presence or absence of a disconnection in the rotary machine or of a power distribution line to the rotary machine, wherein
during rotation of the rotary machine, the control circuitry outputs the switching command and the open-phase determination circuitry determines the presence or the absence of the disconnection in the rotary machine or of the power distribution line to the rotary machine, and
after a predetermined period of time elapses from output of the switching command, the open-phase determination circuitry starts to determine the presence or the absence of the disconnection in the rotary machine or of the power distribution line to the rotary machine,
wherein the predetermined period of time is based on a characteristic of the connection switching device.

15. The rotary-machine control system according to claim 14, wherein the predetermined period of time is greater than or equal to a mechanical time constant of the connection switching device.

16. The rotary-machine control system according to claim 14, wherein when a test voltage for the determination is applied to the rotary machine from the voltage application circuitry, the open-phase determination circuitry determines presence or absence of disconnection by comparing a value of the rotary machine current detected by the current detector with a reference value.

17. The rotary-machine control system according to claim 14, further comprising:
a compressor including the rotary machine, the compressor compressing a medium through rotation of the rotary machine.

* * * * *